(12) United States Patent
Hosogoe (10) Patent No.: US 6,637,260 B2
(45) Date of Patent: Oct. 28, 2003

(54) ROTARY SENSOR HAVING ELASTIC MEMBERS FOR PRESSING ROTOR IN AXIAL AND NON-AXIAL DIRECTIONS

(75) Inventor: Junichi Hosogoe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 193 days.

(21) Appl. No.: 09/907,005

(22) Filed: Jul. 16, 2001

(65) Prior Publication Data

US 2002/0056322 A1 May 16, 2002

(30) Foreign Application Priority Data

Jul. 25, 2000 (JP) ........................................ 2000-229019

(51) Int. Cl.⁷ ............................................. G01M 19/00
(52) U.S. Cl. ...................................................... 73/118.1
(58) Field of Search ................................ 73/118.1, 116, 73/118.2, 862.193

(56) References Cited

U.S. PATENT DOCUMENTS

| | | |
|---|---|---|
| 5,365,168 A | 11/1994 | Reichl |
| 5,460,035 A | 10/1995 | Pfaffenberger |
| 5,567,874 A | 10/1996 | Suzuki et al. |
| 5,880,669 A | 3/1999 | Matsumoto et al. |
| 6,474,146 B2 * | 11/2002 | Okumura ............... 73/118.1 |

FOREIGN PATENT DOCUMENTS

JP   2000-74611   3/2000

* cited by examiner

*Primary Examiner*—Edward Lefkowitz
*Assistant Examiner*—Maurice Stevens
(74) *Attorney, Agent, or Firm*—Beyer Weaver & Thomas (57) ABSTRACT

The structure is arranged such that between the supporting portion 1*e* of the casing 1 and the collar portion 2*s* of the rotor 2, there is displaced the second elastic member 4 for pressing the collar portion in the axial direction of the driving shaft 10, that the pressing force of the second elastic member is greater than the frictional force to be generated between the driving shaft and the first elastic member 5 when the driving shaft moves in the back-and-forth direction of the axial direction, and that the rotor is prevented from moving forward by the pressing force of the second elastic member when the driving shaft moves in the forward direction to go out of the rotor 2.

7 Claims, 12 Drawing Sheets

ROTARY SENSOR HAVING ELASTIC MEMBERS FOR PRESSING ROTOR IN AXIAL AND NON-AXIAL DIRECTIONS

BACKGROUND OF THE INVENTION

1. Field of the Invention

The present invention relates to a rotary sensor, and more particularly to a rotary sensor capable of accurately detecting an angle of rotation to be transmitted from the outside.

2. Description of the Related Art

With reference to the drawings, the description will be made of a conventional rotary sensor.

Figure 18:
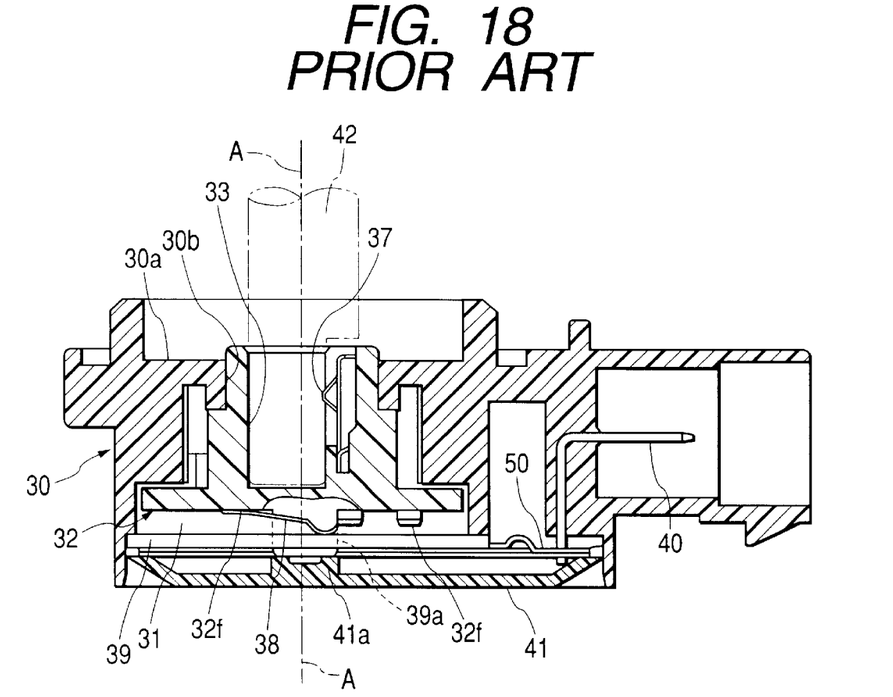
FIG. 18 is an essential sectional view showing a conventional rotary sensor.
Figure 19:
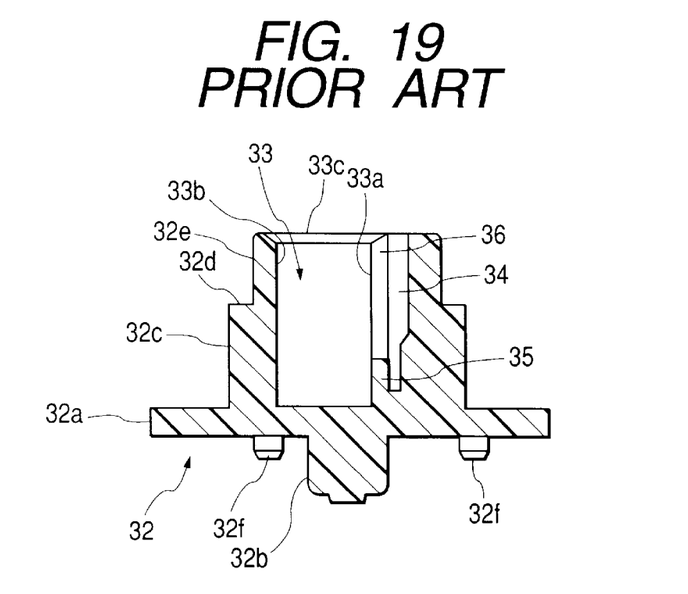
FIG. 19 is a sectional view showing a conventional rotor of the rotary sensor.
Figure 20:
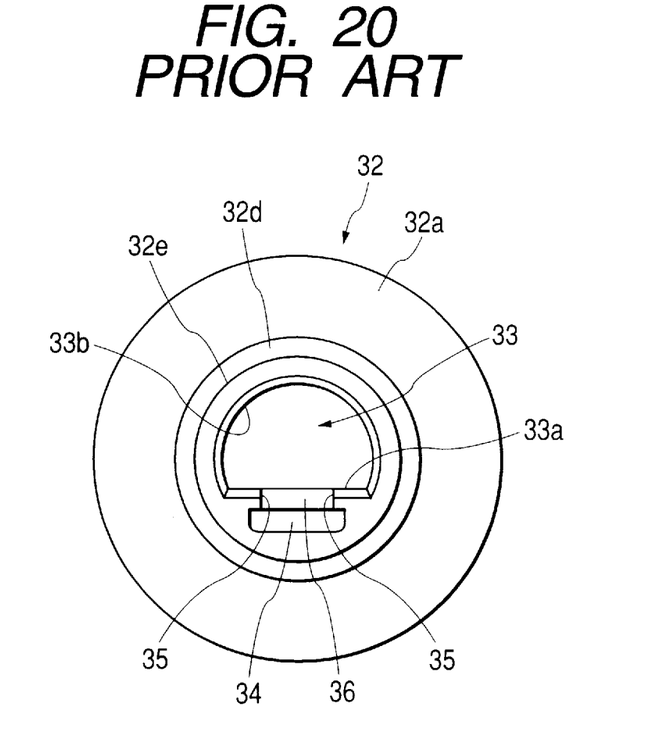
FIG. 20 is a front view showing the rotor of FIG. 19.
Figure 21:
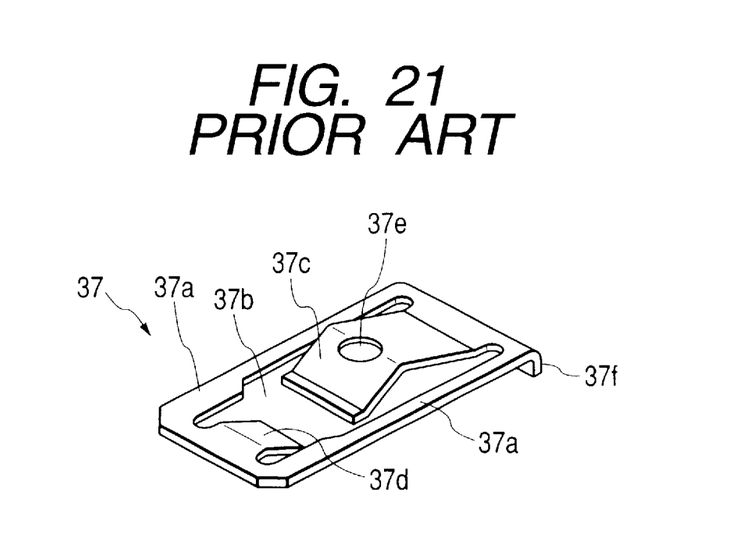
FIG. 21 is a perspective view showing a conventional elastic member of the rotary sensor.
Figure 22:
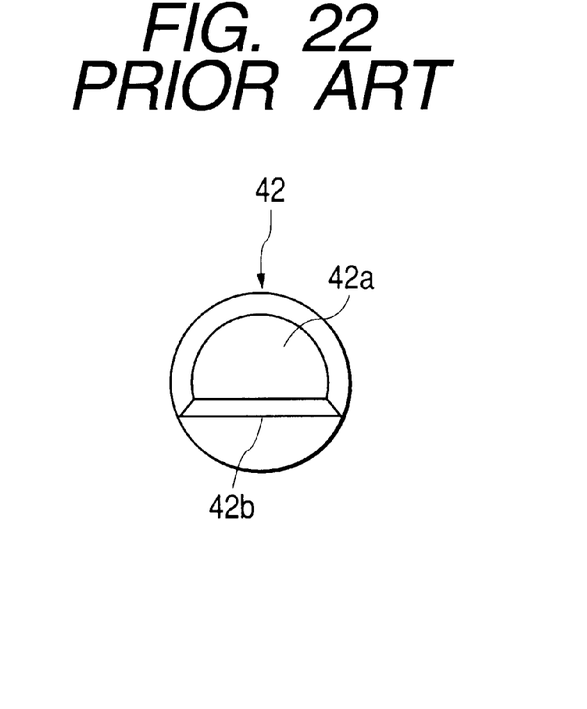
FIG. 22 is a front view showing a conventional driving shaft of the rotary sensor.
Figure 23:
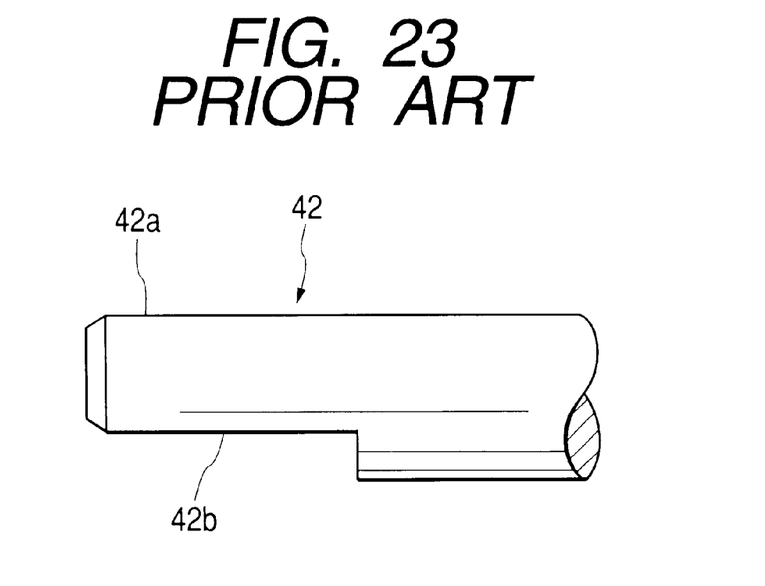
FIG. 23 is a side view showing the driving shaft of FIG. 22.

FIG. 18 is a sectional view showing a conventional rotary sensor under application by Japanese Patent Laid-Open Application No. 2000-74611 and U.S. Pat. Ser. No. 09/388,392 corresponding thereto, FIG. 19 is a sectional view showing a conventional rotor for rotary sensor, FIG. 20 is a front view showing the conventional rotor for rotary sensor, FIG. 21 is a perspective view showing a conventional elastic member for rotary sensor, FIG. 22 is a front view showing a conventional driving shaft for rotary sensor, and FIG. 23 is a side view showing a conventional driving shaft for rotary sensor.

As shown in FIG. 18, the conventional rotary sensor has a casing 30 disposed which is substantially cylindrical in external shape and is made of thermosetting resin or the like, and this casing 30 has a front side plate 30a formed on the upper side thereof, and at the central portion of the front side plate 30a, there is formed a shaft hole 30b.

Inside the casing 30, there is formed a substantially cylindrical storage portion 31, and within the storage portion 31, there is housed a rotor 32. This rotor 32 has, as shown in FIGS. 19 and 20, a disk-shaped collar portion 32a, and at the underside of the collar portion 32a, a shaft portion 32b having a small outside diameter, and on the upper side, a bearing portion 32c having a large outside diameter are projectingly formed respectively.

The bearing portion 32c is formed with a difference in level 32d, a tip end portion 32e above the difference in level 32d is formed to have a smaller outside diameter than the difference in level 32d. Thus, the tip end portion 32e is inserted into the shaft hole 30b of the casing 30 in such a manner that the rotor 32 can rotate with the center line A as the center of rotation within the storage portion 31.

On the side of the collar portion 32a at the underside, there are projectingly formed a plurality of protrusions 32f, on the basis of which a moving contact piece to be described later will be positioned to be mounted.

At the center of rotation of the bearing portion 32c, there is formed an engaging hole 33 having a predetermined depth, and this engaging hole 33 consists of a flat portion 33a and a circular arc portion 33b, is shaped like a D-character as viewed from the front, and a periphery of the inlet portion 33c is chamfered for formation.

Adjacent the flat portion 33a of the engaging hole 33, and in parallel to the flat portion 33a, there is formed a groove portion 34 having predetermined depth and width dimensions.

Between the groove portion 34 and the flat portion 33a of the engaging hole 33, there is formed a partition wall 35, and this partition wall 35 is formed with an open portion 36 for communicating the engaging hole 33 to the groove portion 34 at a predetermined depth from the inlet portion 33c of the engaging hole 33. Since this open portion 36 is, as shown in FIG. 20, formed to be smaller than the width dimension of the groove portion 34, the partition wall 35 protrudes on both sides of the open portion 36.

The groove portion 34 is adapted to be inserted by an elastic member 37 including a plate spring. As shown in FIG. 21, a proximal portion 37a is stamped out by means of a press or the like to form a portion left by stamping out 37b, and the elastic member 37 is formed with a tongue piece-shaped elastically-contacted portion 37c and a loose-stop portion 37d enclosed by the portion left by stamping out 37b.

The elastically-contacted portion 37c is projectingly formed upwardly by being curved in a mountain shape, and at the underside on the opposite side to a direction that this elastically-contacted portion 37c projects, there is provided the loose-stop portion 37d formed by raising up.

The elastic member 37 has a through-hole 37e having a predetermined hole diameter formed by stamping out at the curved apex portion of the elastically-contacted portion 37c, and at the end portion on the right side, there is formed a supporting portion 37f having a predetermined height dimension, bent downward in the same direction as the loose-stop portion 37d.

Thus, when the elastic member 37 is inserted into the groove portion 34, the loose-stop portion 37d on one side comes into elastic contact with between the side walls of the lower part of the groove portion 34, while the supporting portion 37f on the other side abuts against the side wall of the groove portion 34.

By means of an elastic force of the loose-stop portion 37d, the flat proximal portion 37a mainly comes into elastic contact with the partition wall 35 at the side of the open portion 36 so that the elastic member 37 is prevented by the groove portion 34 from falling off and is held.

Also, when the elastic member 37 is inserted into the groove portion 34, the curved apex portion of the elastically-contacted portion 37c is adapted to go through the open portion 36 for projecting on the engaging hole 33 side to be positioned.

Also, on the side, on which the shaft portion 32b at the underside of the collar portion 32a of the rotor 32, has been formed, there is mounted a moving contact piece 38 with a spring operation, which is a part of the angle of rotation detecting member. This moving contact piece 38 is, as shown in FIG. 18, positioned by a plurality of protrusions 32f formed on the collar portion 32a, and is fixed to the rotor 32 by means of thermal caulking or the like.

On a side opposite to the surface, onto which the moving contact piece 38 has been mounted, a resistor substrate 39 is positioned with a predetermined clearance spaced within the casing 30, and is fixed by means of adhesive or the like.

On the surface of the resistor substrate 39, a resistor pattern (not shown) is formed by means of printing or the like, and the moving contact piece 38 is adapted to come into elastic contact with this resistor pattern.

Also, at the central portion of the resistor substrate 39, there is formed a shaft hole 39a, through which the shaft portion 32b of the rotor 32 is inserted. The angle detecting member is constituted by the moving contact piece 38 and the resistor substrate 39 having the resistor pattern.

On the right side of the resistor substrate 39 shown in FIG. 18, a plurality of substantially L character-shaped external terminals 40 are made integral with the casing 30 by means of insert molding or the like. Correspondingly to the resistor pattern (not shown), the external terminals 40 are connected to a terminal 50 drawn out of the end surface of the resistor substrate 39 by means of soldering or the like.

At the underside of the resistor substrate 39, a cover body 41 for closing the storage portion 31 within the casing 30 as a cover is mounted by means of adhesive or the like in such a manner that the interior of the storage portion 31 is hermetically sealed. On the side of the interior of the cover body 41 on the center line A, such a bearing portion 41a as shown in FIG. 18 is projectingly formed, and the shaft portion 32b of the rotor 32 is supported by this bearing portion 41a so that the rotor 32 is prevented from moving in a direction perpendicular to the direction of the center line A for causing no clutter.

In order to detect an angle of rotation of a throttle valve of, for example, an automobile or the like through the use of a conventional rotary sensor having the above-described structure, the casing 30 is first mounted to the main body of a throttle body (not shown). Then, as shown in FIG. 18, the driving shaft 42 coupled to the throttle valve is inserted into the engaging hole 33 of the rotor 32 for being positioned.

This driving shaft 42 has, as shown in FIGS. 22 and 23, a flat portion 42b formed at the circular rod-shaped tip end portion 42a, and the tip end portion 42a is D character-shaped. The driving shaft 42 is adapted to reciprocatively rotate within a predetermined range of angle of rotation by interlocking with the rotation of the throttle valve on the automobile side.

This driving shaft 42 is inserted into the engaging hole 33 of the rotor 32, and in this state, the elastically-contacted portion 37c of the elastic member 37 is brought into elastic contact with the flat portion 42b of the driving shaft 42.

Next, the driving shaft 42 is generally held so as to slightly operate (move) in a back-and-forth direction of the axial direction, and the description will be made of an operation in this case.

First, as regards the operation (movement) in the forward direction in which the driving shaft 42 goes out of the engaging hole 33 of the rotor 32, when the driving shaft 42 slightly moves in the forward direction, the elastically-contacted portion 37c of the elastic member 37 slightly moves in the forward direction with the movement of the driving shaft 42. With the movement of this elastic member 37, the rotor 32, by which the elastic member 37 is locked, slightly moves in the forward direction so that the clearance between the rotor 32 and the resistor substrate 39 is to expand.

The expansion of this clearance slightly deviates an elastically-contacted position of the moving contact piece 38 fixed to the rotor 32 with the resistor pattern of the resistor substrate 39 or reduces the contact pressure.

As described above, according to the conventional rotary sensor, when the driving shaft 42 moves in the forward direction that it goes out of the engaging hole 33 of the rotor 32, the rotor 32 moves in the forward direction together with the driving shaft 42, whereby the elastically-contacted position of the moving contact piece 38 with the resistor pattern of the resistor substrate 39 is slightly deviated, and this deviation slightly deviates a predetermined resistance value, leading to a problem that the output value becomes unstable.

SUMMARY OF THE INVENTION

The rotary sensor according to the present invention solves the above-described problem, and its object is to provide a rotary sensor capable of maintaining stable electrical performance.

According to the present invention, there is provided a rotary sensor, comprising: a rotor having a hole portion and a collar portion, into the hole portion of which a driving shaft is inserted; a casing for rotatably supporting the rotor, having a supporting portion opposite to a surface of the collar portion; an angle detecting member for being operated by rotation of the rotor; and a first elastic member for being held in the hole portion of the rotor and being brought into elastic contact with a peripheral surface of the driving shaft for transmitting rotation of the driving shaft to the rotor, wherein between the supporting portion and the collar portion, there is disposed a second elastic member for pressing the collar portion in the axial direction of the driving shaft, wherein a pressing force of the second elastic member is greater than a frictional force generated between the driving shaft and the first elastic member when the driving shaft moves in a back-and-forth direction of the axial direction, and wherein when the driving shaft moves in the forward direction to go out of the rotor, the structure is arranged such that a pressing force of the second elastic member prevents the rotor from moving forward.

Also, the rotary sensor according to the present invention has the first elastic member made of a flat plate-shaped metallic material, which is constituted by a bent portion bent into a U-character shape, and a plate spring having a spring portion and a holding portion, which are extendedly provided from the bent portion respectively and oppose to each other, the spring portion is brought into elastic contact with the peripheral surface of the driving shaft, and the holding portion abuts against the inner wall of the hole portion.

Also, the rotary sensor according to the present invention has the bent portion disposed on the bottom wall side of the hole portion of the rotor.

Also, the rotary sensor according to the present invention is provided, within the hole portion, with :a flat surface portion provided at a part of the inner wall of the hole portion, and parallel to the axial direction of the driving shaft; and a protruded portion opposite to a part of the flat surface portion, in a clearance provided between the flat surface portion and the protruded portion, a bent portion is located, and a spring portion located at any other place than the clearance is brought into elastic contact with the driving shaft.

Also, in the rotary sensor according to the present invention, the plate spring has a kerf extending from the bent portion toward the free end of the holding portion, the flat surface portion of the hole portion is formed with a ridge portion extending in the axial direction of the driving shaft, and the ridge portion is engaged with the kerf.

Also, in the rotary sensor according to the present invention, the holding portion of the plate spring is formed with a raised-up portion raised up in the direction of the free end of the holding portion, the flat surface portion of the hole portion is provided with a recess, the raised-up portion is engaged with the recess, and the plate spring is prevented from falling off forward in the axial direction of the driving shaft.

Also, in the rotary sensor according to the present invention, at the free end of the spring portion of the plate spring, there is formed a substantially circular arc-shaped elastically-contacted portion in a direction perpendicular to the axial direction of the driving shaft, and the elastically-contacted portion is brought into elastic contact with the peripheral surface of the driving shaft.

DESCRIPTION OF THE PREFERRED EMBODIMENTS

Hereinafter, with reference to the drawings, the description will be made of a rotary sensor according to the present invention.

Figure 1:
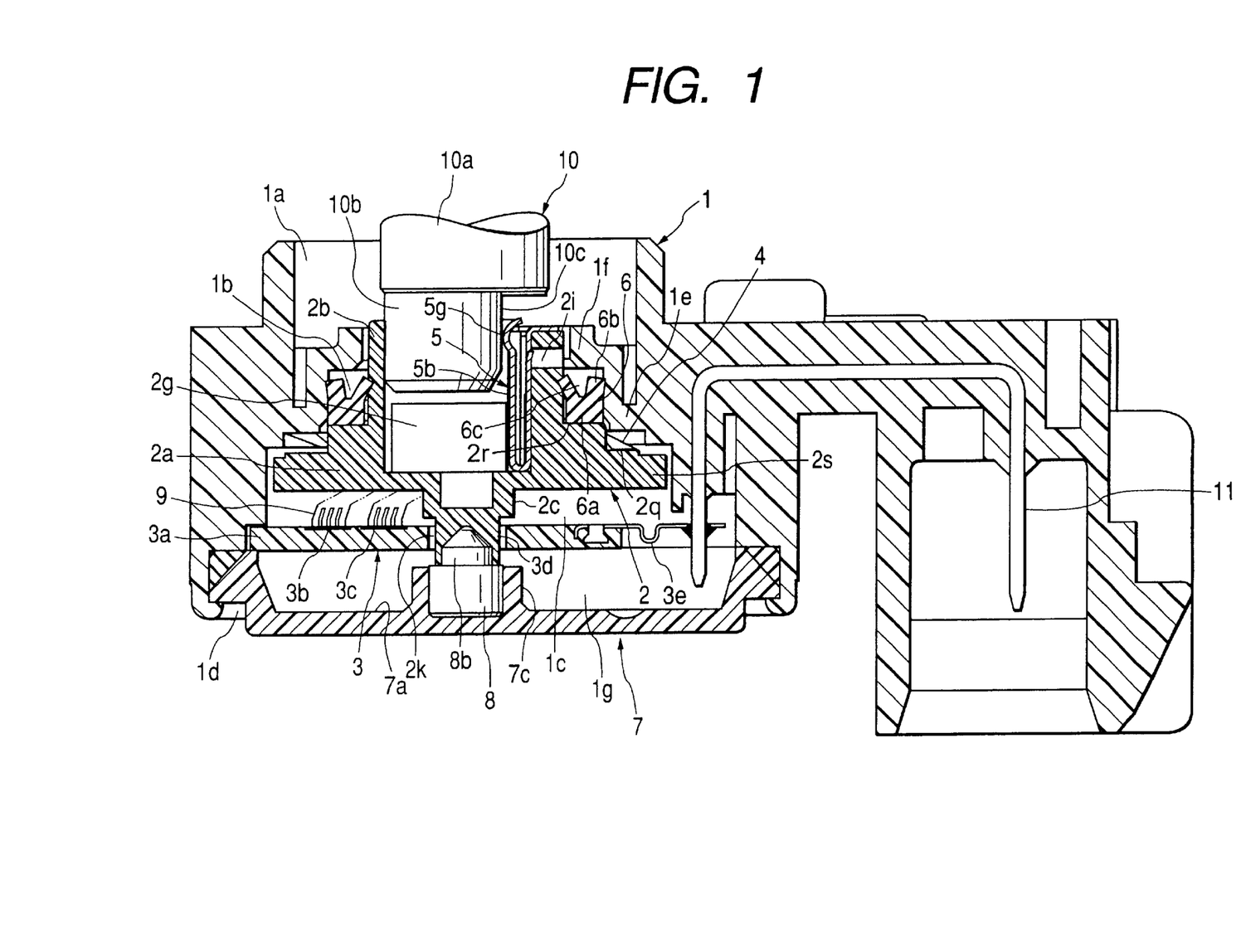
FIG. 1 is an essential sectional view showing a rotary sensor according to an embodiment of the present invention.
Figure 2:
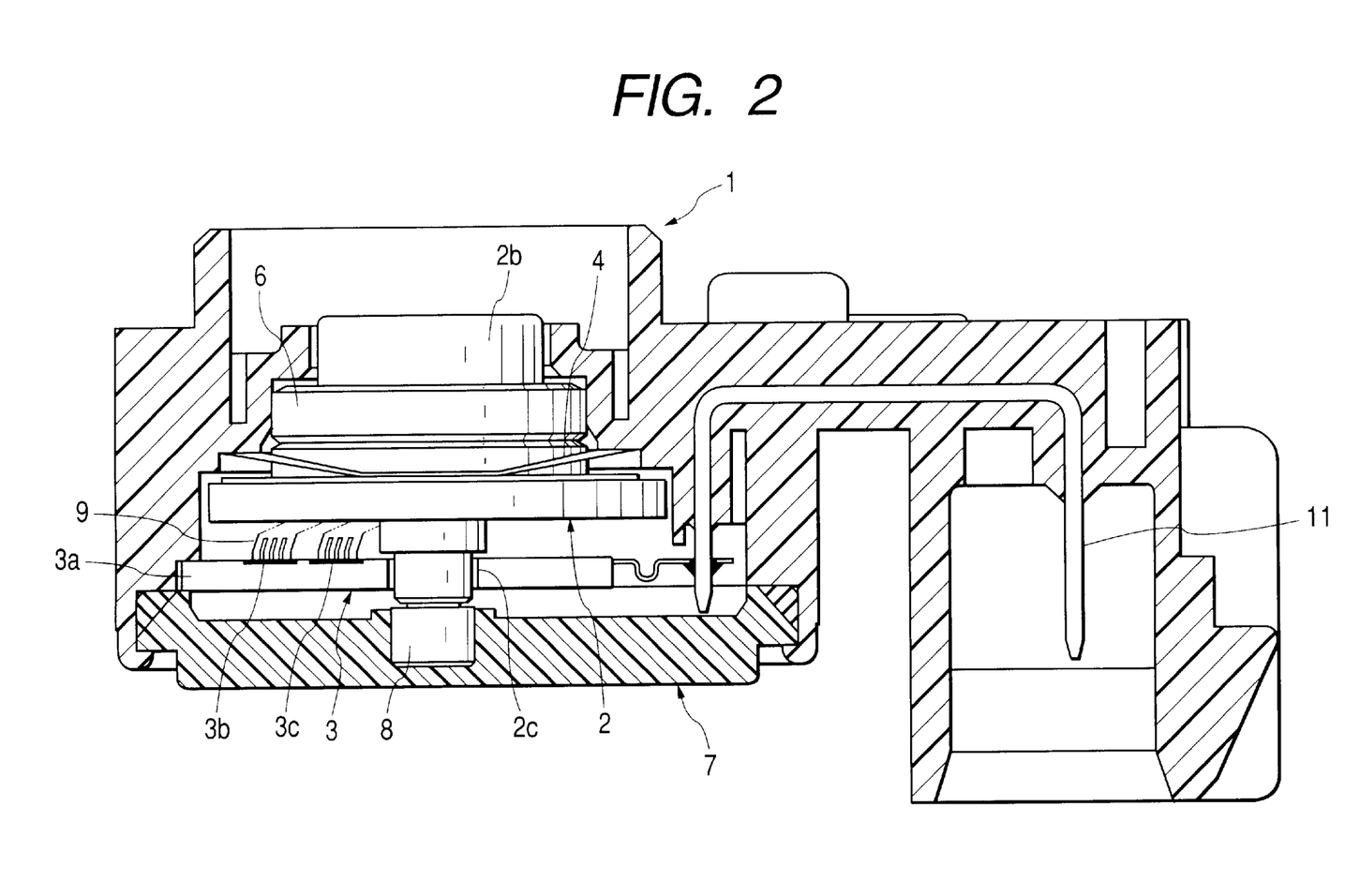
FIG. 2 is an essential sectional view for explaining a rotary sensor according to the embodiment of the present invention.
Figure 3:
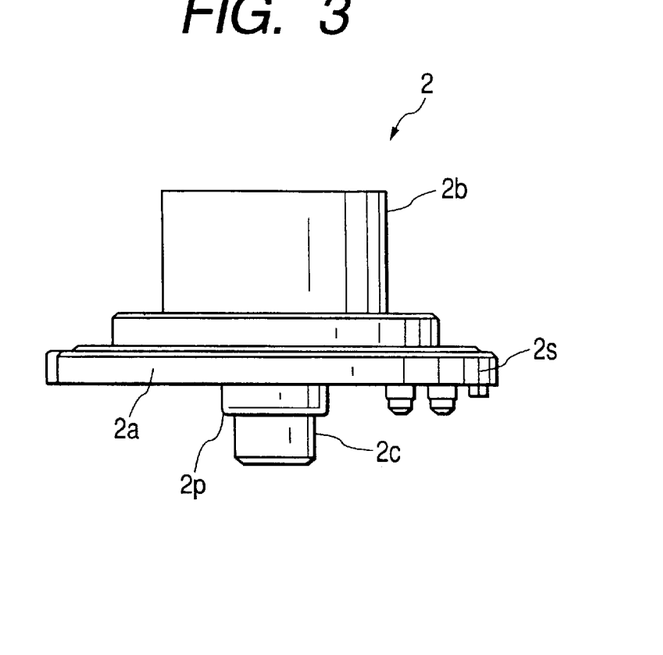
FIG. 3 is a front view showing a rotor of the rotary sensor according to the embodiment of the present invention.
Figure 4:
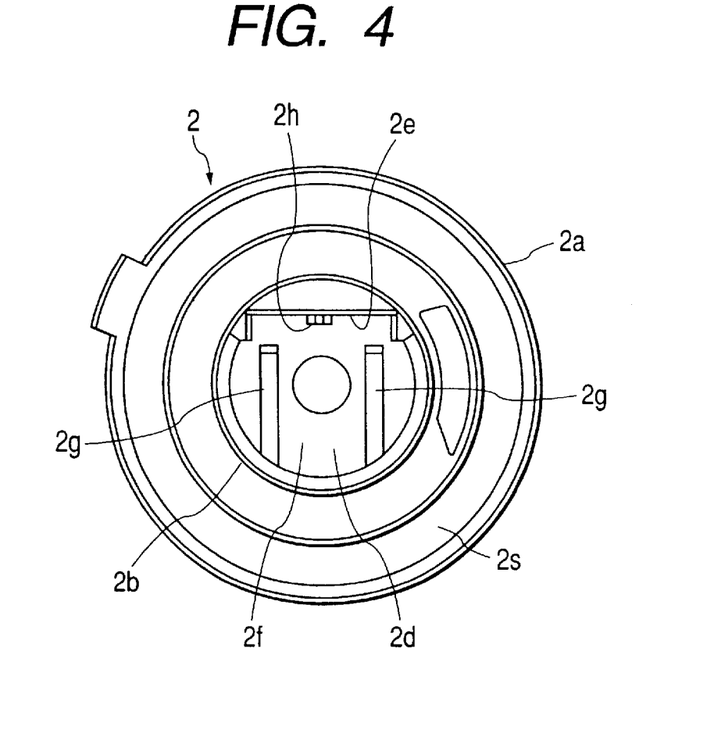
FIG. 4 is a plan view of FIG. 3.
Figure 5:
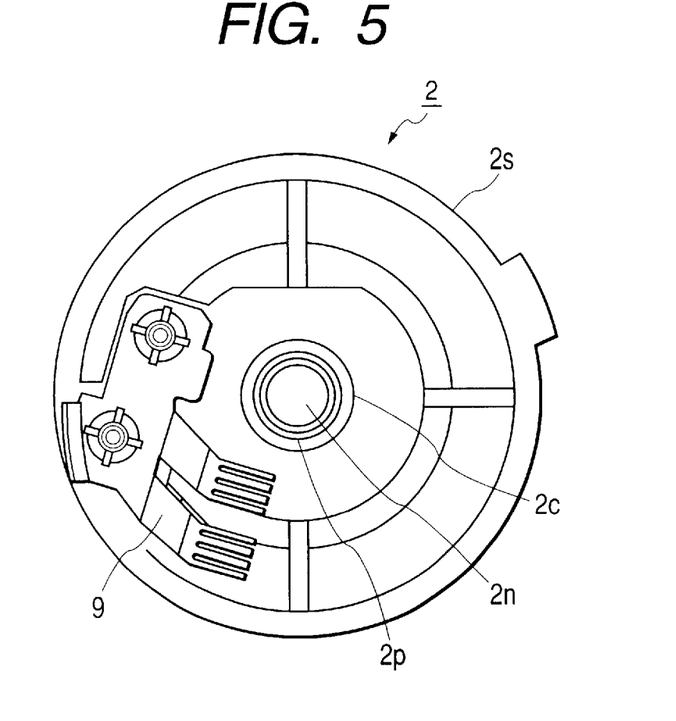
FIG. 5 is a bottom view showing the rotor and a moving contact of the rotary sensor according to the embodiment of the present invention.
Figure 6:
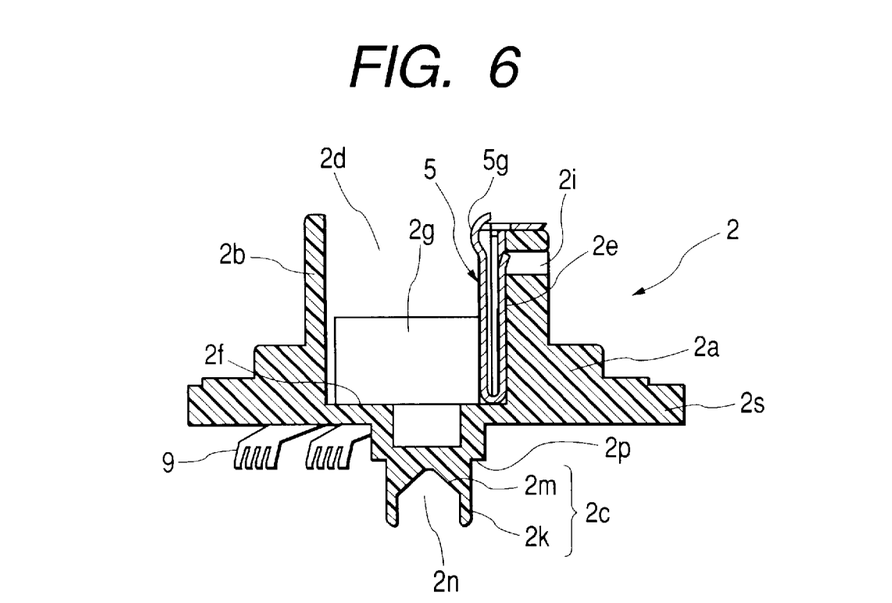
FIG. 6 is a bottom view showing the rotor, the moving contact and a first elastic member of the rotary sensor according to the embodiment of the present invention.
Figure 7:
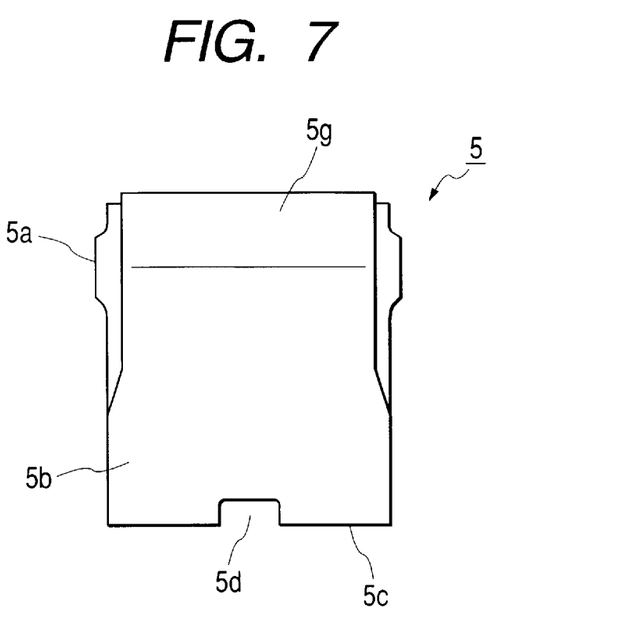
FIG. 7 is a front view showing the first elastic member of the rotary sensor according to the embodiment of the present invention.
Figure 8:
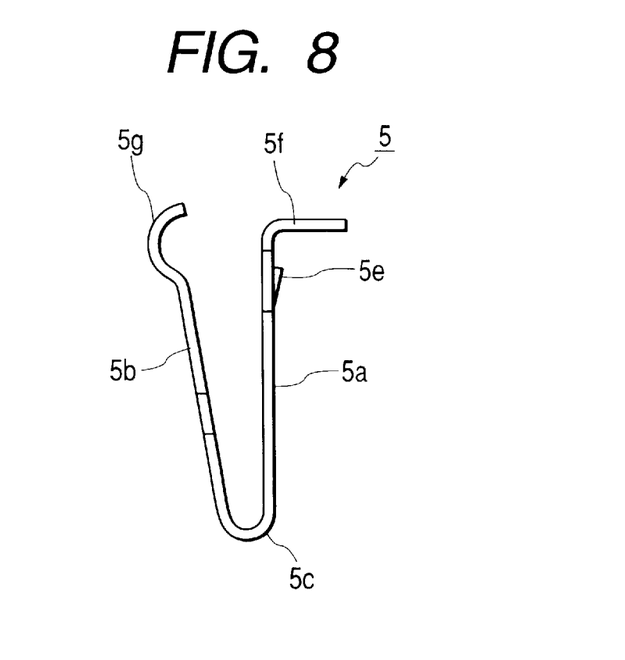
FIG. 8 is a side view of FIG. 7.
Figure 9:
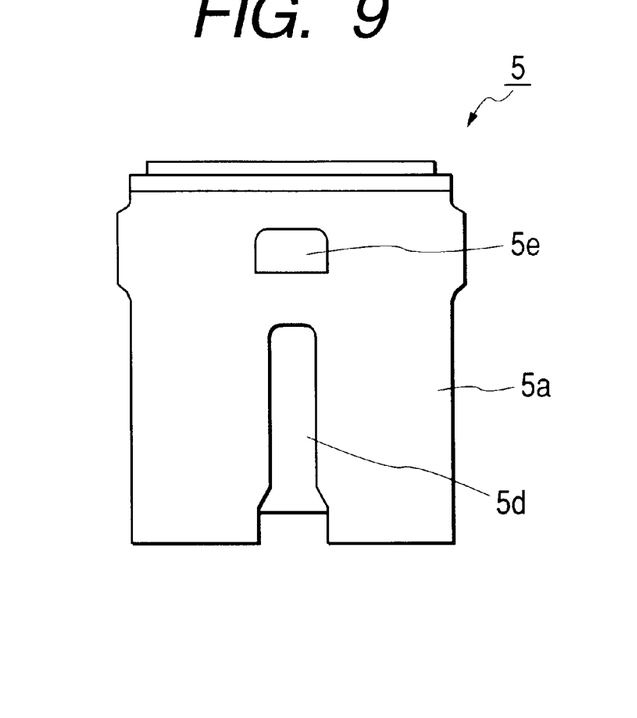
FIG. 9 is a rear view of FIG. 7.
Figure 10:
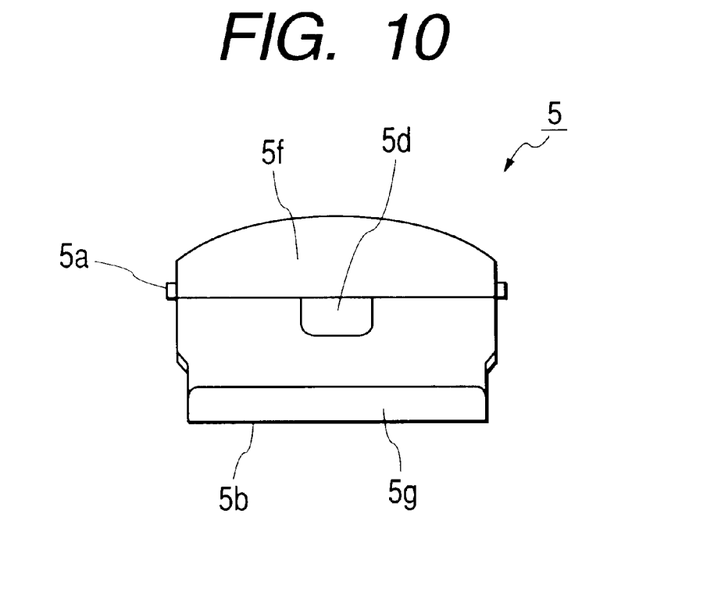
FIG. 10 is a plan view of FIG. 7.
Figure 11:
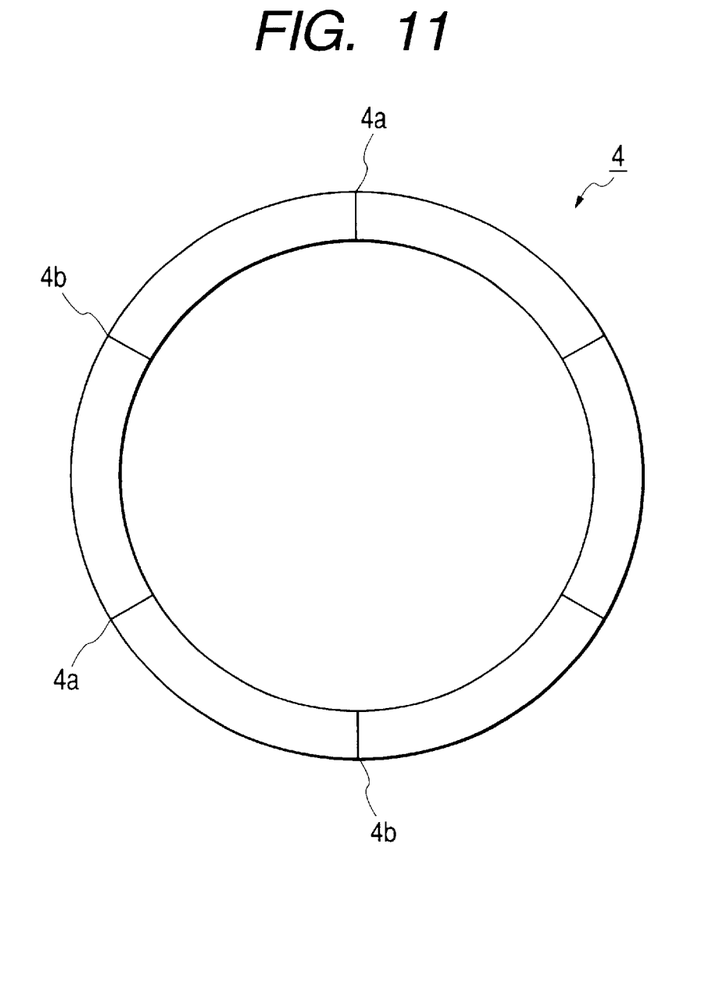
FIG. 11 is a plan view showing the second elastic member of the rotary sensor according to the embodiment of the present invention.
Figure 12:
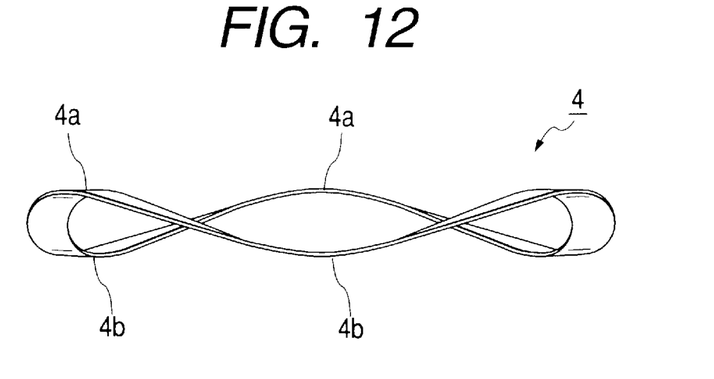
FIG. 12 is a side view of FIG. 11.
Figure 13:
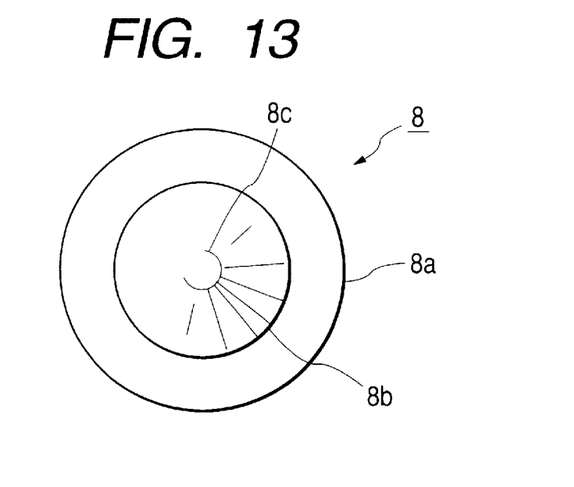
FIG. 13 is a plan view showing a supporting portion of the rotary sensor according to the embodiment of the present invention.
Figure 14:
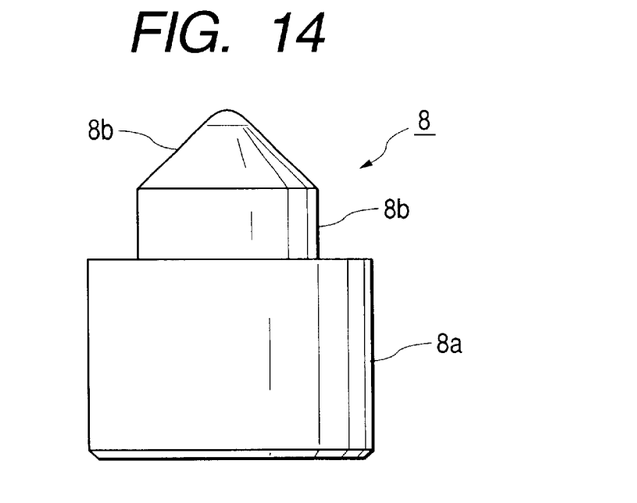
FIG. 14 is a front view of FIG. 13.
Figure 15:
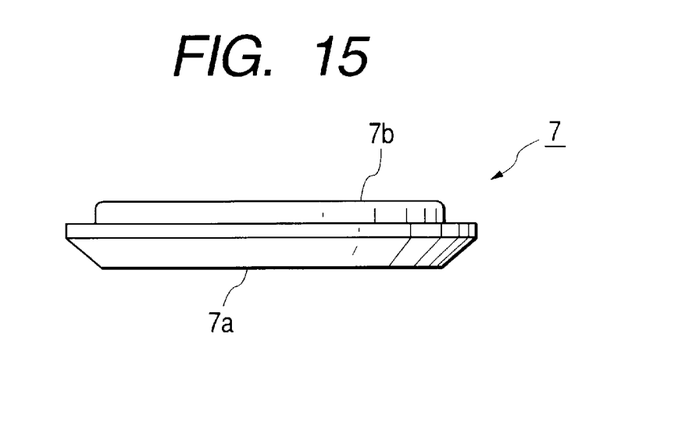
FIG. 15 is a front view showing a cover member of the rotary sensor according to the embodiment of the present invention.
Figure 16:
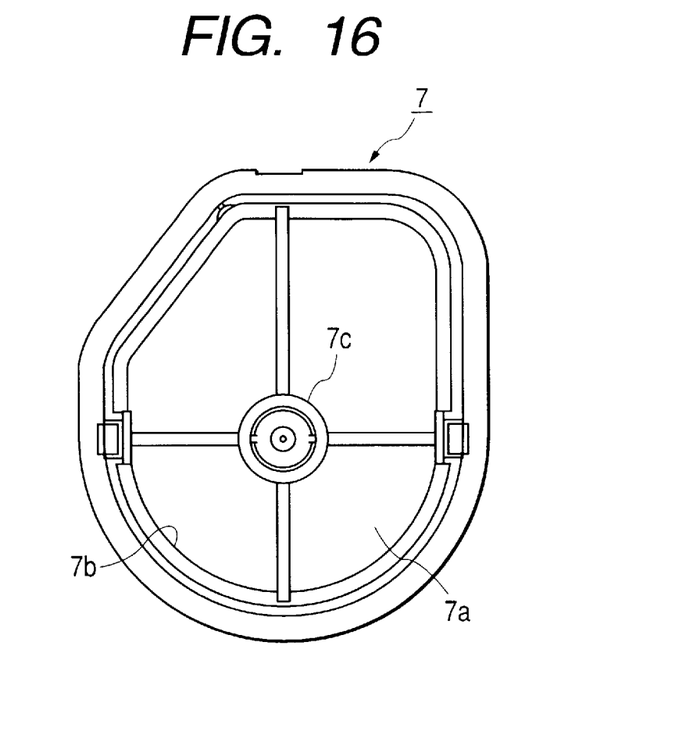
FIG. 16 is a plan view of FIG. 15.
Figure 17:
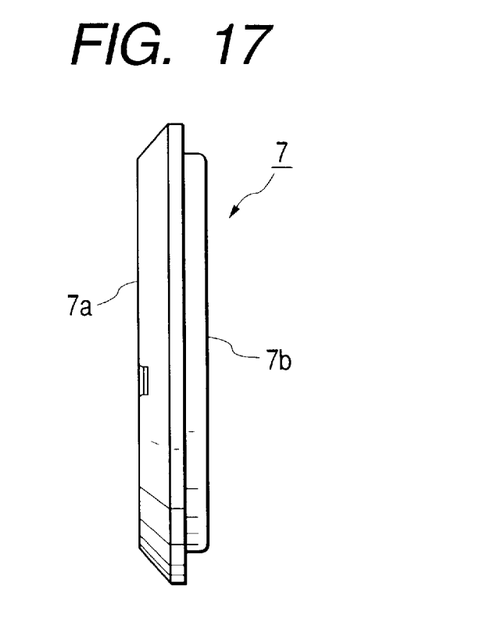
FIG. 17 is a side view of FIG. 16.

FIG. 1 is a sectional view showing a rotary sensor according to an embodiment of the present invention; FIG. 2 is an essential sectional view for explaining a rotary sensor according to the embodiment of the present invention; FIG. 3 is a front view showing a rotor of the rotary sensor according to the embodiment of the present invention; FIG. 4 is a plan view of FIG. 3; FIG. 5 is a bottom view showing the rotor and a moving contact of the rotary sensor according to the embodiment of the present invention; FIG. 6 is a bottom view showing the rotor, the moving contact and a first elastic member of the rotary sensor according to the embodiment of the present invention; FIG. 7 is a front view showing the first elastic member of the rotary sensor according to the embodiment of the present invention; FIG. 8 is a side view of FIG. 7; FIG. 9 is a rear view of FIG. 7; FIG. 10 is a plan view of FIG. 7; FIG. 11 is a plan view showing the second elastic member of the rotary sensor according to the embodiment of the present invention; FIG. 12 is a side view of FIG. 11; FIG. 13 is a plan view showing a supporting portion of the rotary sensor according to the embodiment of the present invention; FIG. 14 is a front view of FIG. 13; FIG. 15 is a front view showing a cover member of the rotary sensor according to the embodiment of the present invention; FIG. 16 is a plan view of FIG. 15; and FIG. 17 is a side view of FIG. 16.

As shown in these figures, the rotary sensor according to the present invention is mainly constituted by: a rotor 2 having an engaging portion 2b, with which a driving shaft such as a slot shaft for vehicles engages; a casing consisting of a casing 1 for rotatably holding the rotor 2 and a cover body 7 for closing an aperture of the casing 1 as a cover, and an angle detecting member consisting of a moving contact 9, a resistor pattern 3b and a collector pattern 3c, housed within this casing, for being operated by rotation of the rotor 2.

As shown in FIGS. 1 to 17, the casing 1 is made of synthetic resin material such as, for example, polyphenylene sulfide (PPS), is formed by means of fabrication, and has a large-diameter hole portion 1a at its end surface, a small-diameter hole portion 1b and a storage portion 1c provided contiguously to the small-diameter hole portion 1b. Also, below the storage portion 1c, that is, on the other end surface of the casing 1, there is formed an open end portion 1d, and accordingly, the casing 1 is constructed to be opened at both end portions: one end surface is opened by the small-diameter hole portion 1b, and the other end surface is opened by the open end portion 1d.

The small-diameter hole portion 1b is formed by through-holes provided at an annular first stepped portion 1e provided to a first diameter dimension and an annular second stepped portion 1f provided to a second diameter dimension smaller than the first diameter dimension. These first stepped portion 1e and second stepped portion 1f are formed as a so-called supporting portion.

The rotor 2 is made of synthetic resin material such as, for example, polybutylene terephthalate (PBT), is formed by means of fabrication, and has a substantially disk-shaped proximal portion 2a, an engaging portion 2b located and provided in front of the proximal portion 2a and a shaft portion 2c located at the rear on the opposite side and provided at the rotation-central portion of the rotor 2. These engaging portion 2b and shaft portion 2c are provided projecting from the proximal portion 2a outwardly respectively. Also, at the outer peripheral edge portion of the proximal portion 2a, there is formed a so-called collar portion 2s.

In this respect, the outer peripheral diameter of the engaging portion 2b is made slightly smaller than the diameter of the small-diameter hole portion 1e, and there is secured space to allow the rotor to incline.

Also, the engaging portion 2b is provided with a recess 2d having a substantially D-character-shaped cross section at the substantially central portion, a flat surface portion 2e provided in a part within the recess 2d, parallel to the axial direction of the rotor 2, and a pair of protruded portions 2g protruding from the bottom wall 2f of the recess 2d toward the interior thereof. In other words, the flat surface portion 2e is provided in parallel to the axial direction of the driving shaft 10 to be described later.

Also, the pair of protruded portions 2g are formed to a height dimension about half of the depth dimension of the recess 2d, the protruded portions 2g are provided such that their sides oppose to a part of the flat surface portion 2e, and there is provided a clearance between the protruded portion 2g and the flat surface portion 2e.

In this respect, the recess 2d constitutes a so-called hole portion.

The flat surface portion 2e is provided with a ridge portion 2h parallel to the axial direction of the driving shaft 10 to be described later, and above the ridge portion 2h, a through-hole 2i as a recess.

Also, at the outer periphery of the engaging portion 2b, there is formed an annular stepped portion 2q.

The shaft portion 2c is substantially column-shaped in external shape, and is provided with a cylindrical portion 2k, which is substantially cylindrical, on the tip end side thereof, and a conical portion 2m, which is substantially conical, on the base side of the cylindrical portion 2k. These cylindrical portion 2k and conical portion 2m constitute a recess 2n.

At the outer periphery of the shaft portion 2c, there is provided an annular stepped portion 2p.

With the engaging portion 2b, there is engaged the driving shaft 10 to be described later. The driving shaft 10 is adapted to reciprocatively rotate within a predetermined range of angle of rotation.

The tip end of the engaging portion 2b of the rotor 2 is inserted into the small-diameter hole portion 1b of the casing 1, and the proximal portion 2a of the rotor 2 is housed within the storage portion 1c of the casing 1.

In this state, a first stepped portion 2q having a large diameter of the rotor 2 and a first stepped portion 1e of the casing 1 are disposed to oppose to each other, and a second stepped portion 2r having a small diameter of the rotor 2 and a second stepped portion 1f of the casing 1 are disposed to oppose to each other.

At the underside (shaft portion 2c side) of the proximal portion 2a of the rotor 2, a moving contact 9 made of metallic material, and formed by means of press working is fixed by appropriate means such as, for example, thermal caulking. This moving contact 9 constitutes a part of the member constituting the angle detecting member.

A resistor substrate 3 is made of, for example, synthetic resin material, and has a flat plate-shaped proximal portion 3a, a resistor pattern 3b and an electric conductor pattern 3c provided on one surface of the proximal portion 3a by means of, for example, printing, a through-hole 3d provided on the proximal portion 3a, and a plurality of (for example, three) terminals 3e electrically, disposed on the right side of the proximal portion 3a, and connected to the resistor pattern 3b and the electric conductor pattern 3c. These resistor pattern 3b and electric conductor pattern 3c constitute a part of the member constituting the angle detecting member.

This resistor substrate 3 is disposed in the storage portion 1c of the casing 1 by appropriate means, and at this time, the tip end portion of the shaft portion 2c of the rotor 2 is fitted in the through-hole 3d of the proximal portion 3a of the resistor substrate 3 beyond one surface (the surface) of the proximal portion 3a.

Also, on the resistor pattern 3b and the electric conductor pattern 3c of the resistor substrate 3, there is disposed the moving contact 9 so as to be able to slidably contact.

A terminal 3e of the resistor substrate 3 is soldered to respective lead-through terminals 11 integrally formed within the casing 1, and the terminal 3e and the lead-through terminal 11 are electrically connected.

A first elastic member 5 is, as shown in FIGS. 7 to 10, made of flat plate-shaped metallic material such as, for example, stainless steel, is formed by means of press working, and has a substantially flat holding portion 5a, a spring portion 5b opposite to the holding portion 5a, and a bent portion 5c, the cross section of which has been bent in a U-character shape, for coupling the holding portion 5a to the spring portion 5b. In other words, the holding portion 5a and the spring portion 5b are extendedly provided from the bent portion 5c respectively, and are formed so as to oppose to each other.

The holding portion 5a has a kerf 5d at its central portion, and a raised-up portion 5e, which has been raised outwardly in the vicinity of one end portion of the kerf 5d. Also, on the free end side of the holding portion 5a, there is disposed a substantially circular arc-shaped stopper 5f extendedly provided in a direction substantially perpendicular to the holding portion 5a. In this respect, this kerf 5d extends from the bent portion 5c toward the free end of the holding portion 5a, and the raised-up portion 5e is raised up toward the free end of the holding portion 5a.

The spring portion 5b is formed, at its free end, with a substantially circular arc-shaped elastically-contacted portion 5g protruded outwardly. This elastically-contacted portion 5g is formed in a direction perpendicular to the axial direction of a driving shaft 10 to be described later.

This first elastic member 5 is constituted as a so-called plate spring. The first elastic member 5 is formed so as to have predetermined spring pressure such as, for example, about 600 g (gram) as a spring pressure f1.

This first elastic member 5 is disposed in a clearance between a flat surface portion 2e and a pair of protruded portions 2g in such a manner that the bent portion 5c abuts against the bottom wall 2f of the recess 2d (hole portion) of the rotor 2.

In this state, the holding portion 5a of the first elastic member 5 is disposed such that it comes into contact with the flat surface portion 2e provided at a part of the inner wall within the recess 2d (hole portion), the kerf 5d engages the ridge portion 2h, and the free end of the raised-up portion 5e engages the through-hole 2i (recess). This engagement of the raised-up portion 5e with the through-hole 2i (recess) prevents the first elastic member 5 (plate spring) from falling off forward in the axial direction of the driving shaft 10 to be described later.

The elastically-contacted portion 5g of the spring portion 5b of the first elastic member 5 is disposed above the tip end portions of the pair of the protruded portions 2g, and the elastically-contacted portion 5g is disposed in a direction that leaves the holding portion 5a to constitute the free end. In other words, in the clearance provided between the flat surface portion 2e and the protruded portion 2g, the bent portion 5c is located, and the elastically-contacted portion 5g of the spring portion 5b positioned in any other place than the clearance is brought into elastic contact with the peripheral surface of the driving shaft 10.

A second elastic member 4 is, as shown in FIGS. 11 and 12, made of metallic material such as, for example, stainless steel, is formed by means of press working, and has annular structure in which a plurality of (for example, three) mountain portions 4a and valley portions 4b are alternately provided. This second elastic member 4 is formed so as to have predetermined spring pressure (pressing force) such as, for example, about 240 g (gram) as spring pressure f2. This second elastic member 4 constitutes a so-called wave washer (spring washer).

This second elastic member 4 is disposed on the collar portion 2s of the engaging portion 2b of the rotor 2, is interposed between the first stepped portion 1e (supporting portion) of the casing 1 and the collar portion 2s, and a pressing force of the second elastic member 4 presses the rotor 2 downward (See FIG. 1).

A third elastic member 6 is made of, for example, rubber material or the like, is annular, and has a base portion 6a having a predetermined first width and an apex portion 6b having a second width larger than the base portion 6a. On the apex portion 6b, there is disposed an annular groove portion 6c.

This third elastic member 6 is disposed such that the base portion 6a abuts against a second stepped portion 2r of the rotor 2.

A cover member 7 is, as shown in FIGS. 15 to 17, made of synthetic resin material such as, for example, polyphenylene sulfide (PPS), is formed by means of fabrication, and has a flat plate-shaped cover portion (bottom wall) 7a, a side wall 7b extendedly provided in a substantially vertical direction from the outer peripheral edge of the cover portion (bottom wall) 7a, and a substantially cylindrical holding portion 7c projecting in an inward direction of the cover portion (bottom wall) 7a. This cover member 7 is disposed so as to close an one open end portion of the casing 1 as a cover. At this time, between the back surface of the proximal portion 3a of the resistor substrate 3 disposed within the casing 1 and the cover portion 7a, there is formed a clearance portion 1g.

A supporting portion 8 is, as shown in FIGS. 13 and 14, made of metallic material such as, for example, brass, is formed by means of cutting working, and has a circular column-shaped proximal portion 8a, a circular column portion 8b projecting from one end portion of the proximal portion 8a outwardly, and a conical portion 8c provided on the tip end side of the circular column portion 8b. In other words, the supporting portion 8 has the conical portion 8c provided on the tip end side and the base-side circular column portion 8b contiguously provided to the conical portion 8c.

The proximal portion 8a is pressed into the holding portion 7c of the cover member 7 to dispose this supporting portion 8 and pressing the proximal portion 8a into the holding portion 7c makes the supporting member 8 integral with the cover member 7.

The supporting portion 8 is disposed opposite to the shaft portion 2c of the rotor 2, and supports the shaft portion 2c. At this time, the conical portion 8c of the supporting portion 8 is disposed within the conical portion 2m of the shaft portion 2c, and the circular column portion 8b of the supporting portion 8 is disposed within the cylindrical portion 2k of the shaft portion 2c. In other words, within the recess 2n of the shaft portion 2c, there are disposed the conical portion 8c of the supporting portion 8 and the cylindrical portion 2k.

The structure is arranged such that the shaft portion 2c is supported by the supporting portion 8, whereby the rotor 2 is capable of rotating with the axial center of the shaft portion 2c as the center.

The driving shaft 10 is made of, for example, metallic material, is formed by means of cutting working, and has a circular column portion 10a, and a driving unit 10b having a D-character-shaped cross section provided at one end portion of the circular column portion 10a. On a part of the outer periphery of the driving unit 10b, there is provided a flat portion 10c.

This driving shaft 10 is engaged with the engaging portion 2b (recess 2d: hole portion) of the rotor 2 through the first elastic member 5. In this state, the elastically-contacted portion 5g of the spring portion 5b of the first elastic member 5 comes into elastic contact with the flat portion 10c of the driving shaft 10 so that the driving shaft 10 is fitted into the engaging portion 2b (recess 2d: hole portion) by means of the first elastic member 5.

The driving shaft 10 is fitted by means of the first elastic member 5, whereby the driving shaft 10 is displaced in a state in which it is restricted within the engaging portion 2b.

In this state, the driving shaft 10 may move forward and backward in the axial direction thereof. The driving shaft 10 is formed such that when it moves in a back-and-forth direction as described above, there is caused a frictional force f3 of, for example, about 180 g (gram) between the flat portion 10c, which is a peripheral surface of the driving shaft 10, and the elastically-contacted portion 5g of the first elastic member 5.

This frictional force f3 can be calculated by multiplying the spring pressure f1 (about 600 g) of the first elastic member 5 by a coefficient of friction of the driving shaft 10 and the first elastic member 5 being about 0.3.

Thus, this frictional force f3 is determined so as to be a smaller force (f2>f3) than the spring pressure f2 (pressing force) of the second elastic member 4.

In this respect, in the above-described embodiment, the cover member 7 and the supporting portion 8 have been separately formed and made integral by pressing the supporting portion 8 into the cover member 7, but the present invention is not restricted thereto. The cover member 7 and the supporting portion 8 may be constructed such that they are integrally fabricated through the use of, for example, the same synthetic resin material as a matter of course.

In this respect, in the above-described embodiment, the second elastic member 4 has been formed by a wave washer made of metallic material, but the present invention is not restricted thereto, but it goes without saying that rubber, coiled spring or the like may be used.

Next, the description will be made of an operation of the rotary sensor according to the present invention.

First, the circular column portion 10a of the driving shaft 10 is reciprocatively rotated with the axis of the circular column portion 10a as the center within a predetermined range of angle of rotation. By means of this reciprocative rotation of the driving shaft 10, the rotor 2 is similarly reciprocatively rotated within a predetermined range of angle of rotation.

In this respect, even if the circular column portion 10a and the rotor 2 are coupled in a somewhat off-center state at this time, the rotor 2 obliquely moves in any direction perpendicular to the axial direction of the driving shaft 10 with the conical portion 8c as the fulcrum so that both are combined.

Next, by means of the reciprocative rotation of the rotor 2, the moving contact 9 fixed to the rotor 2 slides on the resistor pattern 3b of the resistor substrate 3 and the electric conductor pattern 3c, and this sliding of the moving contact 9 causes the lead-through terminal 11 to output a predetermined resistance value made variable.

In other words, on the basis of variations in resistance value resulting from the sliding operation by the resistor pattern 3b, the electric conductor pattern 3c and the moving contact 9 constituting the angle detecting member, the operation is made so as to detect an angle of rotation of the driving shaft 10 within the range of angle of rotation.

Next, the description will be made of a slight operation (movement) of the driving shaft 10 in a back-and-forth direction of the axial direction.

First, as regards an operation (movement) of the driving shaft 10 in a forward direction to go out of the recess 2d of the rotor 2, when the driving shaft 10 slightly moves forward, the elastically-contacted portion 5g of the spring portion 5b of the first elastic member 5 is brought into elastic contact with a peripheral surface of the driving shaft 10 with a frictional force f3, and since the frictional force f3 has been set to be smaller than a pressing force f2 which presses the rotor 2 in the rear direction of the axis, the rotor 2 does not move in the forward direction, but only the driving shaft 10 slightly moves in the forward direction with a state disposed in a predetermined position maintained.

Thereby, the structure is arranged such that a dimensional value between the back surface of the proximal portion 2a of the rotor 2 and one surface of the resistor substrate 3 can be kept to be a substantially constant dimensional value. Also, since the sliding pressure of the moving contact 9 can be also kept constant, the sliding position of the moving contact 9 will not be deviated.

Next, as regards an operation (movement) of the driving shaft 10 in the backward direction to approach the bottom wall 2f of the recess 2d of the rotor 2, since the lower end of the shaft portion 2 abuts against the supporting portion 8 even if the driving shaft 10 slightly moves in the backward direction, the rotor 2 does not move in the backward direction, but slides between the driving shaft 10 and the first elastic member 5.

Thereby, the structure is arranged such that a dimensional value between the back surface of the proximal portion 2a of the rotor 2 and one surface of the resistor substrate 3 can be kept to be a substantially constant dimensional value. Also, since the sliding pressure of the moving contact 9 can be also kept constant, the sliding position of the moving contact 9 will not be deviated.

As described above, according to the rotary sensor of the present invention, the structure is arranged such that when the driving shaft moves in the forward direction, in which the driving shaft goes out of the rotor, the rotor is prevented from moving forward because of the pressing force of the second elastic member. Thereby, the moving contact constituting the angle detecting member is brought into elastic contact with the resistor pattern with the elastically-contacted position therebetween stabilized, and therefore, it is possible to provide a rotary sensor having stable electrical characteristics.

Also, this rotary sensor is constructed of a bent portion bent into an U-character shape, and a plate spring having a spring portion and a holding portion which are extendedly provided from the bent portion respectively to oppose each other, whereby it is possible to provide the plate spring having a long spring span, and to simply provide a plate spring having appropriate spring pressure at low price.

Also, in this rotary sensor, the bent portion has been disposed on the bottom wall side of the hole portion of the rotor, whereby the bent portion can be reliably held on the bottom wall side, and the plate spring can be reliably sandwiched by the hole portion.

Also, in this rotary sensor, the bent portion is located in a clearance provided between the flat surface portion and the protruded portion, and the spring portion located in any other place than the clearance is brought into elastic contact with the driving shaft, whereby it is possible to reliably hold the bent portion in the clearance, and to reliably sandwich the plate spring.

Also, in this rotary sensor, the plate spring has a kerf extending from the bent portion in the direction of the free end of the holding portion, on the flat surface portion of the hole portion, there is formed a ridge portion extending in the axial direction of the driving shaft, and the ridge portion is engaged with the kerf, whereby the plate spring can be reliably positioned easily on the flat surface portion.

Also, in this rotary sensor, the raised-up portion is engaged with the recess, and the plate spring has been prevented from falling off forward in the axial direction of the driving shaft, whereby the falling-off of the plate spring can be reliably prevented compactly.

Also, in this rotary sensor, at the free end of the spring portion, there is formed a substantially circular arc-shaped elastically contacted portion in a direction perpendicular to the axial direction of the driving shaft, and the elastically-contacted portion is brought into elastic contact with the peripheral surface of the driving shaft, whereby the effect is exhibited that insertion can be easily performed when the driving shaft is inserted into the hole portion of the rotor.

What is claimed is:

1. A rotary sensor, comprising:
   a driving shaft which rotates around an axial line;
   a rotor having an engaging portion which has a hole portion in the center and a collar portion which surrounds the engaging portion, the hole portion receiving an end portion of the driving shaft which is inserted into the hole portion from above;
   a casing which supports the rotor such that the rotor can rotate about the axial line and which includes a small-diameter hole portion through which the engaging portion is inserted, a storage portion which is formed contiguously to the small-diameter hole portion and which stores the collar portion, a rotor-supporting portion which is provided on the inner bottom surface of the storage portion and which supports the rotor at the bottom end thereof, and a supporting portion which is provided on the inner surface of the casing around the small-diameter hole portion and which has a surface that faces the top surface of the collar portion;
   an angle detecting member which is operated by rotation of the rotor and stored in the storing portion; and
   a first elastic member for being held in the hole portion of the rotor and being brought into elastic contact with a peripheral surface of the driving shaft for transmitting rotation of the driving shaft to the rotor,
   wherein between the supporting portion and the collar portion, there is disposed a second elastic member for pressing the collar portion downward in the axial direction of the driving shaft so as to press the bottom end of the rotor against the rotor-supporting portion,
   wherein a pressing force of the second elastic member is greater than a frictional force to be generated between the driving shaft and the first elastic member when the driving shaft moves upward in the axial direction, and
   wherein when the driving shaft moves upward to go out of the rotor, the structure is arranged such that a pressing force of the second elastic member prevents the rotor from moving upward.

2. The rotary sensor according to claim 1, wherein the first elastic member is made of a flat plate-shaped metallic material, and is constituted by a bent portion bent into an U-character shape, and a plate spring having a spring portion and a holding portion, which are extendedly provided from the bent portion respectively and oppose to each other, and wherein the spring portion is brought into elastic contact with a peripheral surface of the driving shaft, and the holding portion abuts against an inner wall of the hole portion.

3. The rotary sensor according to claim 2, wherein the bent portion is disposed on a bottom wall side of the hole portion of the rotor.

4. The rotary sensor according to claim 2, wherein at a free end of the spring portion of the plate spring, there is formed a substantially circular arc-shaped elastically-contacted portion in a direction perpendicular to the axial direction of the driving shaft, and the elastically-contacted portion is brought into elastic contact with a peripheral surface of the driving shaft.

5. The rotary sensor according to claim 2, wherein within the hole portion, there are provided: a flat surface portion provided at a part of the inner wall of the hole portion, and parallel to the axial direction of the driving shaft; and a protruded portion opposite to a part of the flat surface portion, and wherein in a clearance provided between the flat surface portion and the protruded portion, the bent portion is located, and the spring portion located at any other place than the clearance is brought into elastic contact with the driving shaft.

6. The rotary sensor according to claim 5, wherein the plate spring has a kerf extending from the bent portion toward the free end of the holding portion, the flat surface portion of the hole portion is formed with a ridge portion extending in the axial direction of the driving shaft, and the ridge portion is engaged with the kerf.

7. The rotary sensor according to claim 5, wherein the holding portion of the plate spring is formed with a raised-up portion raised up in the direction of a free end of the holding portion, the flat surface portion of the hole portion is provided with a recess, the raised-up portion is engaged with the recess, and the plate spring is prevented from falling off forward in the axial direction of the driving shaft.

* * * * *